(12) United States Patent
Perry et al.

(10) Patent No.: US 12,704,218 B2
(45) Date of Patent: Aug. 11, 2026

(54) Z-HINGE POINT OF SALE SYSTEM

(71) Applicant: Elo Touch Solutions, Inc., Knoxville, TN (US)

(72) Inventors: Brian Perry, Knoxville, TN (US); David Noppenberger, Baltimore, MD (US); Fareed Uddin, San Jose, CA (US)

(73) Assignee: Elo Touch Solutions, Inc., Knoxville, TN (US)

( * ) Notice: Subject to any disclaimer, the term of this patent is extended or adjusted under 35 U.S.C. 154(b) by 71 days.

(21) Appl. No.: 18/519,798

(22) Filed: Nov. 27, 2023

(65) Prior Publication Data

US 2025/0172234 A1 May 29, 2025

(51) Int. Cl.
*F16M 11/22* (2006.01)
*G06F 1/16* (2006.01)
*G06Q 20/20* (2012.01)

(52) U.S. Cl.
CPC ........... *F16M 11/22* (2013.01); *G06F 1/1601* (2013.01); *G06Q 20/20* (2013.01)

(58) Field of Classification Search
CPC .. F16M 11/22; F16M 2200/08; G06F 1/1601; G06Q 20/20; G07G 1/0018
See application file for complete search history.

(56) References Cited

U.S. PATENT DOCUMENTS 11,257,057 B1 * 2/2022 Asmi ........................ G07G 1/01
2001/0032857 A1 * 10/2001 Yeh ...................... F16M 13/027 220/756
2013/0314300 A1 * 11/2013 Moscovitch .......... G06F 3/1431 345/1.3
2014/0279116 A1 * 9/2014 Vasquez ............ G06Q 20/3227 705/21
2019/0032843 A1 * 1/2019 Burton ................... A47G 1/202
2019/0056058 A1 * 2/2019 Pell ........................ F16M 11/04
2021/0248099 A1 * 8/2021 Hasegawa ............. G06F 1/1654
2023/0267088 A1 * 8/2023 Ekanayake .......... G07G 1/0018 710/105

FOREIGN PATENT DOCUMENTS

JP 2022091021 A 6/2022
KR 200476965 Y1 4/2015

OTHER PUBLICATIONS

International Search Report and Written Opinion directed to related International Application No. PCT/US2024/056068, mailed Mar. 19, 2025; 16 pages.

* cited by examiner

*Primary Examiner* — Pegeman Karimi
(74) *Attorney, Agent, or Firm* — Sterne, Kessler, Goldstein & Fox P.L.L.C.

(57) ABSTRACT

A point of sale (POS) device includes a stand, and a monitor. The stand includes a base and a bracket that is pivotably connected to the base. The bracket includes a hook and a fastener hole. The monitor is configured to rest on the hook. The monitor comprises another fastener hole configured to align with the fastener hole of the bracket when the monitor rests on the hook.

13 Claims, 12 Drawing Sheets

Z-HINGE POINT OF SALE SYSTEM

TECHNICAL FIELD

The present disclosure relates to mechanism for connecting a display to a stand, and in particular to a connection usable in a point of sale device.

BACKGROUND

Electronic displays for many purposes are configured to be removably attachable to fixtures and other devices. For example, some point of sale devices are provided in the form of an assembly including a stand and a monitor, with the monitor being removably mounted to the stand. Some existing solutions for connecting displays to other objects rely on fastening the display to the other object. Some such solutions rely entirely on the fasteners to connect the display to a mount such that the display has no connection to the mount if no fasteners have been applied. Thus, users may experience difficulty in keeping a display in alignment with the mount while the first fasteners are applied, and may need to find external support for the display or to rest the display on a surface while maneuvering the mount in order to apply the first fasteners to the display and the mount. Additionally, in conventional systems, when the display and the mount are assembled, the mounting mechanism remains visible which can disrupt the overall appearance of the point of sale system.

SUMMARY

Aspects of the present disclosure relate to a bracket for connecting a monitor to a stand. The monitor and the stand may be components of a point of sale device. The bracket may be connected to a stand to form a base for the device. The bracket may cooperate with complementary features of the monitor to releasably engage the monitor. The bracket may include features configured to support monitor without the assistance of fasteners, such as screws. The bracket may also comprise fastener holes to facilitate fastening the monitor to the bracket. The features of the bracket configured to support the monitor may enable the base and monitor to remain upright and connected before any fasteners have been applied. Fasteners may be applied to secure the monitor and base together while the monitor and base remain upright. The monitor may include features complementary to the features of the bracket to facilitate engagement between the bracket and the monitor. The monitor may include one or more pockets for receiving supporting features of the bracket. The supporting features of the bracket may include one or more hooks.

In some aspects of the present disclosure, a point of sale (POS) device may comprise a stand. The stand may comprise a base. The stand may also comprise a bracket. The bracket may be pivotably connected to the base. The bracket may comprise a hook and a first fastener hole. The POS device may also comprise a monitor configured to rest on the hook. The monitor may comprise a second fastener hole aligned with the first fastener hole when the monitor is resting on the hook.

In some embodiments according to any of the foregoing, the base may comprise a platform configured to support the device. The base may also comprise an arm extending from the platform. The bracket may be mounted to the arm.

In some embodiments according to any of the foregoing, the arm may comprise an edge that is farther from the platform than the bracket is from the platform.

In some embodiments according to any of the foregoing, the bracket may comprise a plate from which the hook extends. No part of the plate may be further from the platform than the edge is from the platform.

In some embodiments according to any of the foregoing, the edge may be above the platform. The bracket may comprise a plate from which the hook extends. The plate may be configured to be positioned entirely below the edge when the device rests on the platform.

In some embodiments according to any of the foregoing, the bracket may comprise a plate. The hook may extend upward from the plate.

In some embodiments according to any of the foregoing, the first fastener hole may be below the hook.

In some embodiments according to any of the foregoing, the hook may be a first hook. The bracket may comprise a second hook. The monitor may comprise a first pocket and a second pocket configured to receive the first hook and the second hook such that the bracket supports the monitor via the first hook and the second hook without a screw inserted through the first fastener hole and the second fastener hole.

In some embodiments according to any of the foregoing, the base may comprise a display.

In some embodiments according to any of the foregoing, the display may be a first display. The monitor may comprise a second display. The first display and the second display may face away from one another.

In some embodiments according to any of the foregoing, the stand may comprise a first user interface. The monitor may comprise a second user interface. The first user interface and second user interface may face away from one another.

In some embodiments according to any of the foregoing, the bracket may comprise a plate from which the hook extends. Exactly two fastener holes may be defined through the plate. The exactly two fastener holes may comprise the first fastener hole.

In further aspects of the present disclosure, a point of sale kit may comprise a monitor comprising a pocket. The point of sale kit may also comprise an adapter. The adapter may comprise a plate and a hook. The hook may be configured to support the monitor when received in the pocket. The plate may comprise fastener holes configured for fastening the adapter to a stand.

In some embodiments according to any of the foregoing, the fastener holes may be arranged in a VESA standard mount hole pattern.

In some embodiments according to any of the foregoing, the fastener holes may comprise a first plurality of fastener holes. The adapter may further comprise an adapter fastener hole. The monitor may comprise a monitor fastener hole configured to align with the adapter fastener hole when the hook is received in the pocket.

In some embodiments according to any of the foregoing, the monitor may comprise a recess configured to receive the plate when the hook is received in the pocket.

In further aspects of the present disclosure, a stand for a point of sale device may comprise a base that comprises a display facing in a first direction. The stand may also comprise a bracket that is pivotably connected to the base. The bracket may comprise a hook configured to support a monitor. The bracket may extend in a second direction from the base, the second direction being away from the first direction.

In some embodiments according to any of the foregoing, the bracket may be configured to be fastenable to the monitor.

In some embodiments according to any of the foregoing, the bracket may be connected to the base at a pivot point, and the bracket comprises a fastener hole below the pivot point.

In some embodiments according to any of the foregoing, the hook may extend above the pivot point.

In some embodiments according to any of the foregoing, the base may comprise a platform and an arm that extends from the platform. The arm may define an upper edge. The bracket may be pivotable to a position entirely below the upper edge.

Other features of the present disclosure and advantages thereof will become apparent from the following detailed description of exemplary embodiments of the present disclosure with reference to the accompanying drawings.

BRIEF DESCRIPTION OF THE DRAWINGS

The accompanying drawings, which form a part of the description, illustrate embodiments of the present disclosure and together with the description serve to explain the principles of the present disclosure.

The present disclosure may be more clearly understood from the following detailed description with reference to the accompanying drawings, wherein.

It should be noted that, in the embodiments described below, the same reference number which denotes the same parts or parts having the same function may be commonly used in different drawings, and repeated descriptions thereof may be omitted. In some instances, similar numerals and letters are used to denote similar items, so once an item is defined in one drawing, it does not require further discussion in subsequent drawings.

DETAILED DESCRIPTION

The present disclosure will be described below with reference to the drawings, in which several embodiments of the present disclosure are shown. It should be understood, however, that the present disclosure may be implemented in many different ways, and is not limited to the embodiments described below. In fact, the embodiments described hereinafter are intended to make the present disclosure to be more complete and to adequately explain the scope of the present disclosure to a person skilled in the art. It should also be understood that, the embodiments disclosed herein can be combined in various ways to provide many additional embodiments.

It should be understood that, the wording in the present disclosure is only used for describing particular embodiments and is not intended to limit the present disclosure. All the terms used in the specification (including technical and scientific terms) have the meanings as normally understood by a person skilled in the art, unless otherwise defined. For the sake of conciseness and/or clarity, well-known functions or constructions may not be described in detail.

The term “exemplary”, as used herein, means “serving as an example, instance, or illustration” rather than as a “model” to be exactly reproduced. Any implementation described herein as exemplary is not necessarily to be construed as preferred or advantageous over other implementations. Furthermore, there is no intention for the present disclosure to be bound by any expressed or implied theory presented in the part of technical field, the background art, the content of the disclosure or the embodiments.

Herein, certain terminology, such as the terms “first”, “second” and the like, may also be used in the following specification for the purpose of reference only, and are thus not intended to be limiting. For example, the terms “first”, “second” and other such numerical terms referring to structures or elements do not imply a sequence or order unless clearly indicated by the context.

Further, it should be noted that, the terms “comprise”, “include”, “have” and any other variants, as used herein, specify the presence of stated features, unity, steps, operations, units, and/or components, but do not preclude the presence or addition of one or more other features, unities, steps, operations, units and/or components, and/or groups thereof.

Figure 1A:
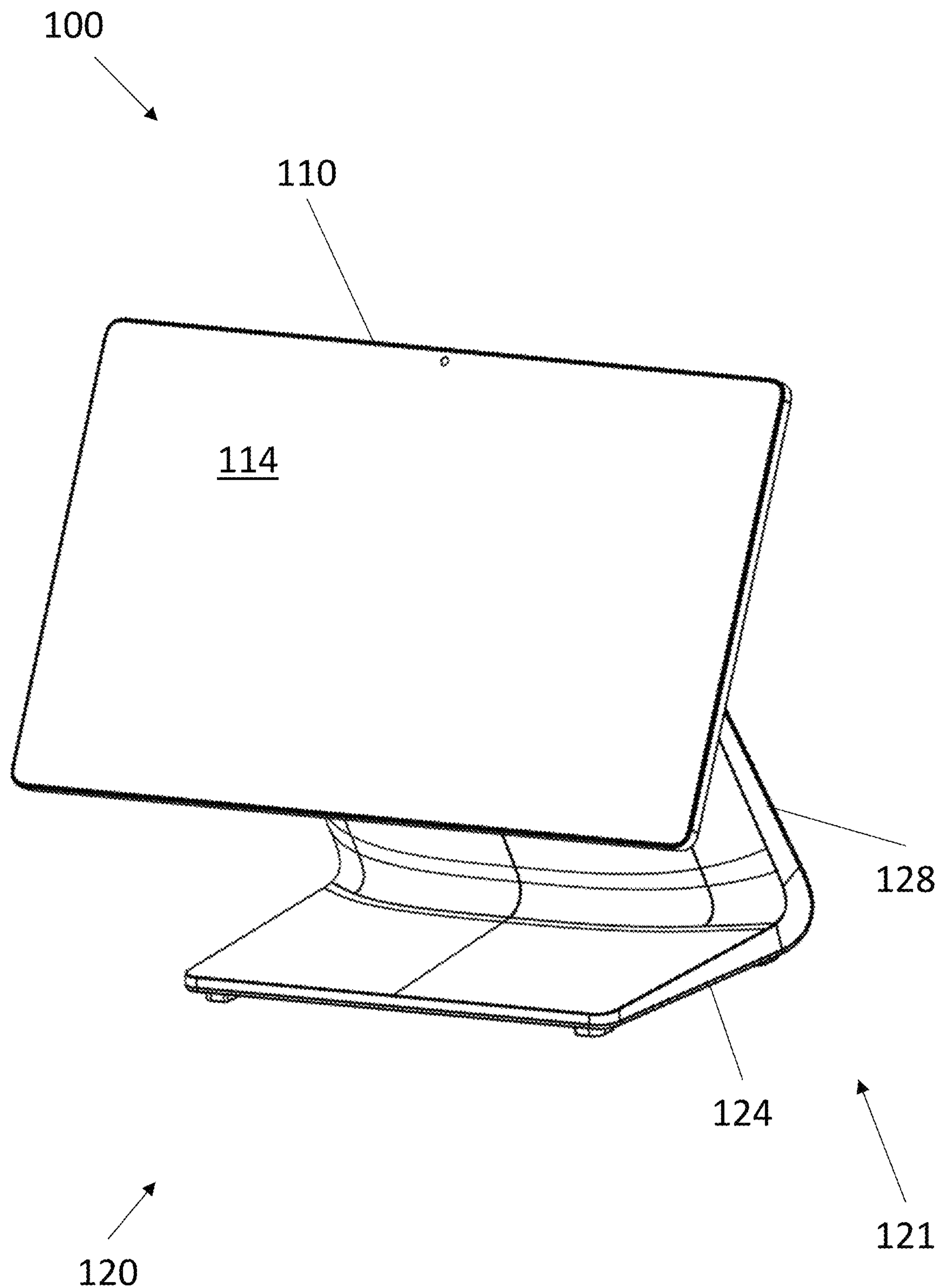
FIG. 1A is an oblique perspective view of a front side of a point of sale device according to an aspect of the present disclosure.
Figure 1B:
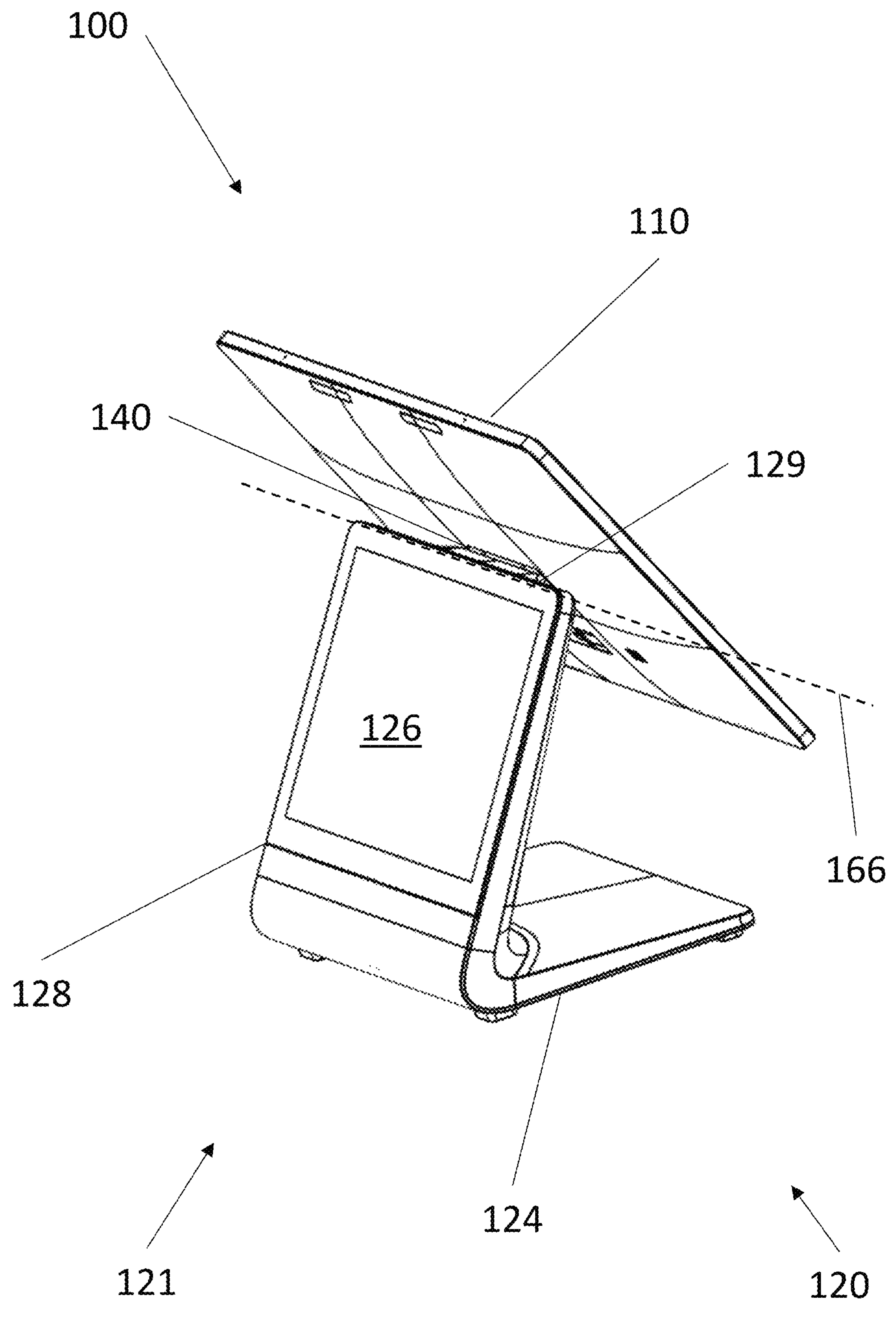
FIG. 1B is an oblique perspective view of a back side of the point of sale device of FIG. 1A.

FIGS. 1A and 1B shows a device 100. Device 100 can be a point of sale device 100 alike to the “example 100” described and illustrated in U.S. Published Application No. 2023/0267088 (“the ’088 publication”), corresponding to U.S. application Ser. No. 17/679,738, filed on Feb. 24, 2022, which is incorporated herein by reference, in any aspects that do not conflict with features of device 100 illustrated or described in the present disclosure. However, device 100 need not have all features of the “example 100” of the ’088 publication. Further, the concepts disclosed herein are applicable outside of the specific context of point of sale devices. Thus, the mechanical devices and connections of the present disclosure may be used in assemblies for other purposes, including mounting displays to stands generally.

Device 100 comprises a monitor 110 and a stand 120. Stand 120 comprises a base 121 and a bracket 140. Base 121 of the illustrated example in turn comprises a platform 124 and an arm 128. Platform 124 is configured to support device 100. In the illustrated example, platform 124 supports device 100 by providing a footprint on which device 100 rests. In further examples, platform 124 can support device 100 by being fixable to other structures, such as by providing fastener holes enabling platform 124 to be fastened to other structures. Arm 128 extends from platform 124 to support monitor 110 at a position spaced from platform 124. However, in other examples, base 121 may lack a distinct platform 124 and arm 128 while still providing a footprint for device 100 or otherwise supporting device 100.

Monitor 100 is mounted to base 121 by bracket 140. Bracket 140 is pivotable relative to base 121 about pivot axis 166. Monitor 100 is therefore also pivotable relative to base 121 about pivot axis 166. Pivot axis 166 of the illustrated example is below an upper edge 129 of arm 128, which conceals the mechanical connection between base 121 and bracket 140. A pivot point is defined where bracket 140 connects to base 121 along pivot axis 166. Bracket 140 can extend both above and below the pivot point. For example, hooks 144 of bracket 140, which will be described further below with regard to FIGS. 3A and 3B, can extend above the pivot point. Further, fastener holes 146, which will also be described further below with regard to FIGS. 3A and 3B, can be located below the pivot point.

Monitor 110 comprises a monitor display 114. Monitor display 114 can provide part or all of a user interface of device 100. That is, in some examples, monitor display 114 can be a touch screen capable of both showing information and receiving user inputs, thereby providing a user interface. In other examples, monitor display 114 can be a screen that cannot directly receive inputs and may instead provide a part of a user interface that includes additional elements for receiving inputs, such as a keyboard or mouse.

Arm 128 can comprise a stand display 126. Stand display 126 can also provide a user interface, such as wherein stand display 126 is a touch screen. In further examples, stand display 126 can provide part of a user interface that includes additional elements for receiving inputs.

Figure 2A:
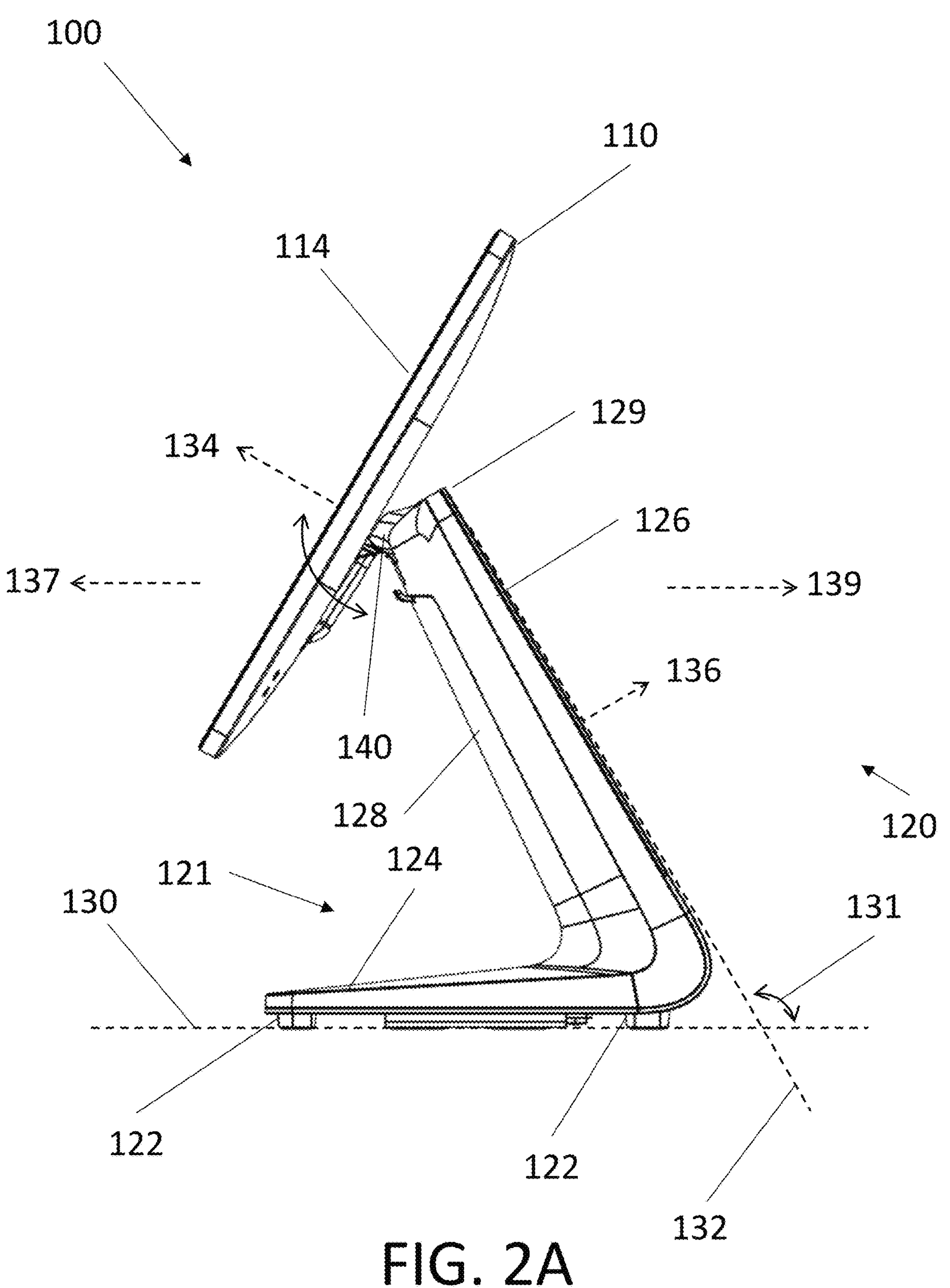
FIG. 2A is a side elevation view of the point of sale device of FIG. 1A in a first position.

Turning to FIG. 2A, monitor display 114 and stand display 126 can face away from one another. For example, a seller direction 137 and an opposite customer direction 139 can be defined relative to device 100. Monitor display 114 can face in a monitor display direction 134 that includes a component in seller direction 137 while stand display 126 can face in a stand display direction 136 that includes a component in the customer direction 139. Thus, monitor display 114 and stand display 126 can face away from one another by facing in directions having components in opposite directions on a common axis.

Platform 124 defines a support plane 130 on which device 100 is supported. In the illustrated example, platform 124 comprises multiple feet 122 that collectively define support plane 130. However, in other examples, platform 124 can comprise a single foot surface that defines support plane 130. In further example, platform 124 can comprise features enabling fixation of platform 124 to other structures, and in such examples support plane 130 can be defined relative to the fixation features.

Arm 128 extends away from support plane 130 to support monitor 110 at a location spaced from support plane 130. Arm 128 of the illustrated example is inclined relative to support plane 130 to extend on an arm plane 132 at an inclination angle 131 relative to support plane 130. Thus, arm 128 of the illustrated example extends in seller direction 137 over platform 124. Inclination angle 131 is an obtuse angle in customer direction 139 in the illustrated example, though other angles, including right angles, are possible in other examples. Stand display 126 can extend on arm plane 132 such that stand display direction 136 is normal to arm plane 132. Where stand display direction 136 is normal to arm plane 132, an obtuse inclination angle 131 in customer direction 139 can facilitate ease of viewing of stand display 126 by a customer having a perspective spaced from support plane 130.

Bracket 140 connects monitor 110 to stand 120. Bracket 140 is pivotably coupled to base 121. Thus, an angle of monitor display direction 134 relative to support plane 130 can be adjusted by pivoting bracket 140 relative to base 121. An angle of monitor display 114 relative to stand display direction 136 can also be adjusted by pivoting bracket 140 relative to base 121. Bracket 140 can be on a side of base 121 that faces in the seller direction 137. Thus, bracket 140 can be positions behind base 121 from a perspective of an individual viewing device 100 from customer direction 139.

Figure 2B:
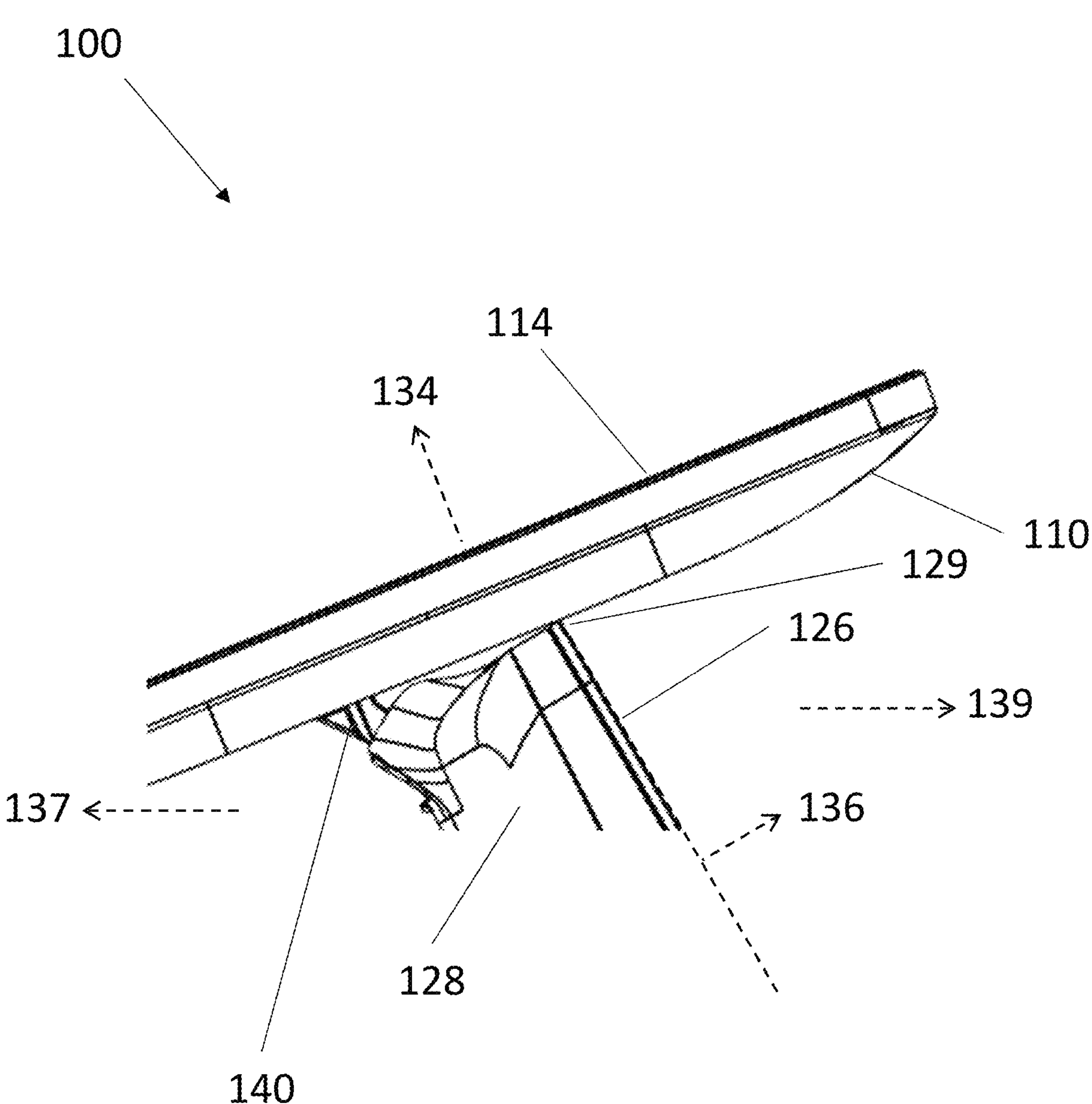
FIG. 2B is a side elevation view of a portion of the point of sale device of FIG. 1A in a second position.

Base 121 comprises an upper edge 129 above stand display 126. Upper edge 129 of the illustrated example is defined at an upper end of arm 128. However, in other examples, edge 129 can be defined by other features, such as other portions of base 121 that may comprise stand display 126. As shown in FIG. 2B, edge 129 can define a limit on one side of a range of motion available to monitor 110 relative to stand 120 where monitor 110 pivots into abutment with edge 129. In other examples, monitor 110 may not be pivotable into abutment with edge 129, meaning edge 129 would not limit monitor's 110 range of motion relative to stand 120.

Figure 2C:
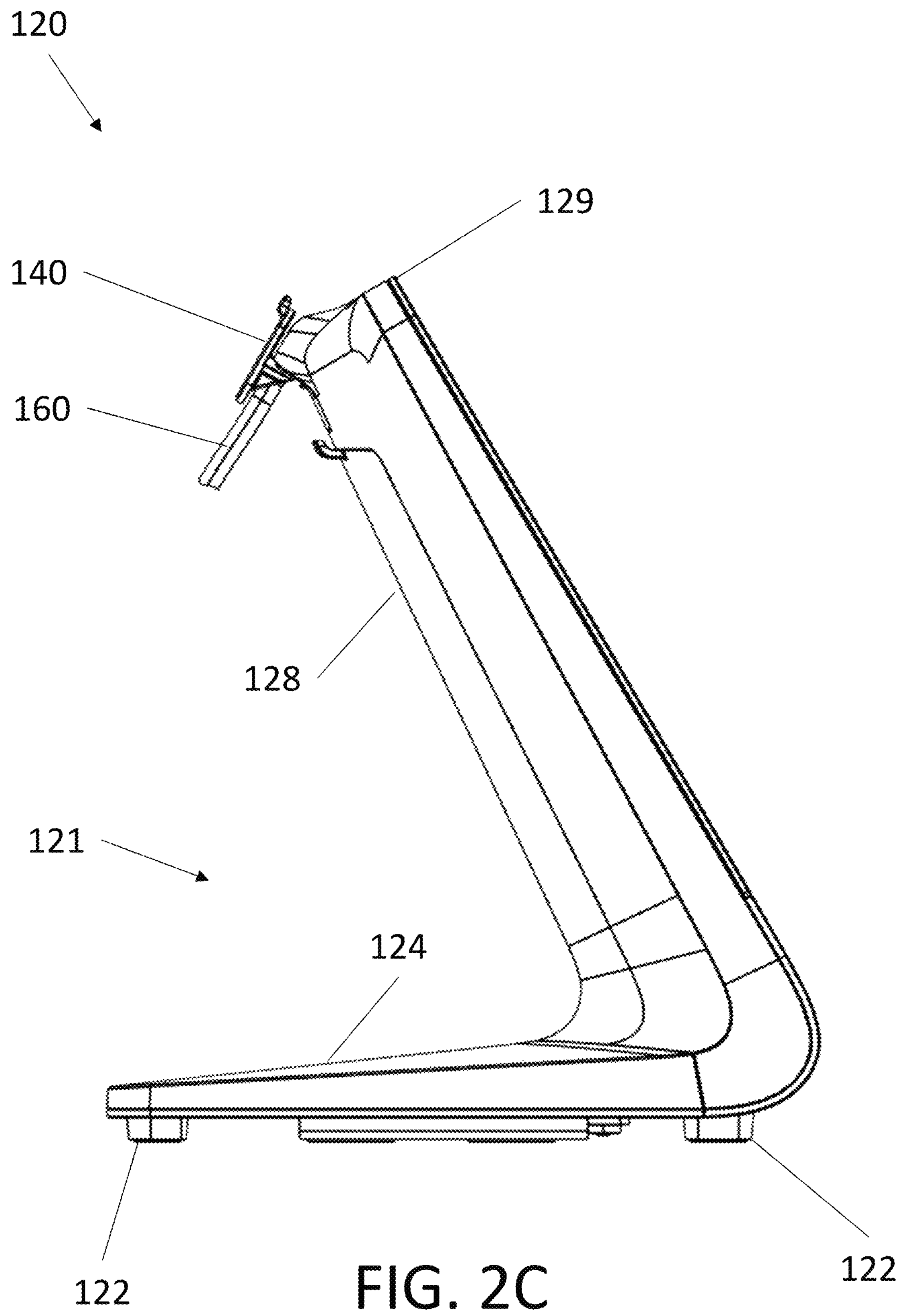
FIG. 2C is a side elevation view of a base of the point of sale device of FIG. 1A.

As shown in FIG. 2C, bracket 140 can be positioned and shaped to reduce a visibility of bracket 140 past edge 129 to a customer viewing device 100 from customer direction 139. Thus, edge 129 can be further from platform 124 than bracket 140 is from platform. For example, bracket 140 can be configured so that, in at least one position within bracket's 140 range of motion relative to base 121, no part of bracket 140 that is not covered by monitor 110 when monitor 110 is mounted to bracket 140 extends above edge 129. In further examples, including the illustrated example, in at least one position within bracket's 140 range of motion relative to base 121, bracket 140 is entirely below edge 129. Positioning bracket 140 to be nearer to platform 124 than edge 129 is to platform, or so that bracket 140 is largely or entirely below edge 129, can obscure bracket 140 from the view of a customer viewing device 100 from customer direction 139. For example, bracket 140 can be positioned so that no part of plate 142, described further below with regard to FIGS. 3A and 3B, extends farther from platform 124 than edge 129 is from platform 124. Further, edge 129 can be farther from platform 124 than bracket 140 is from platform 124. This can, in turn, obscure seams, gaps, and fasteners at the connection between bracket 140 and monitor 110 from the view of a customer viewing device 100 from customer direction 139. Obscuring the connection between monitor 110 and stand 120 this way can contribute to a sleek, modern appearance of device 100, which may improve a user experience for both sellers and customers.

Figure 3A:
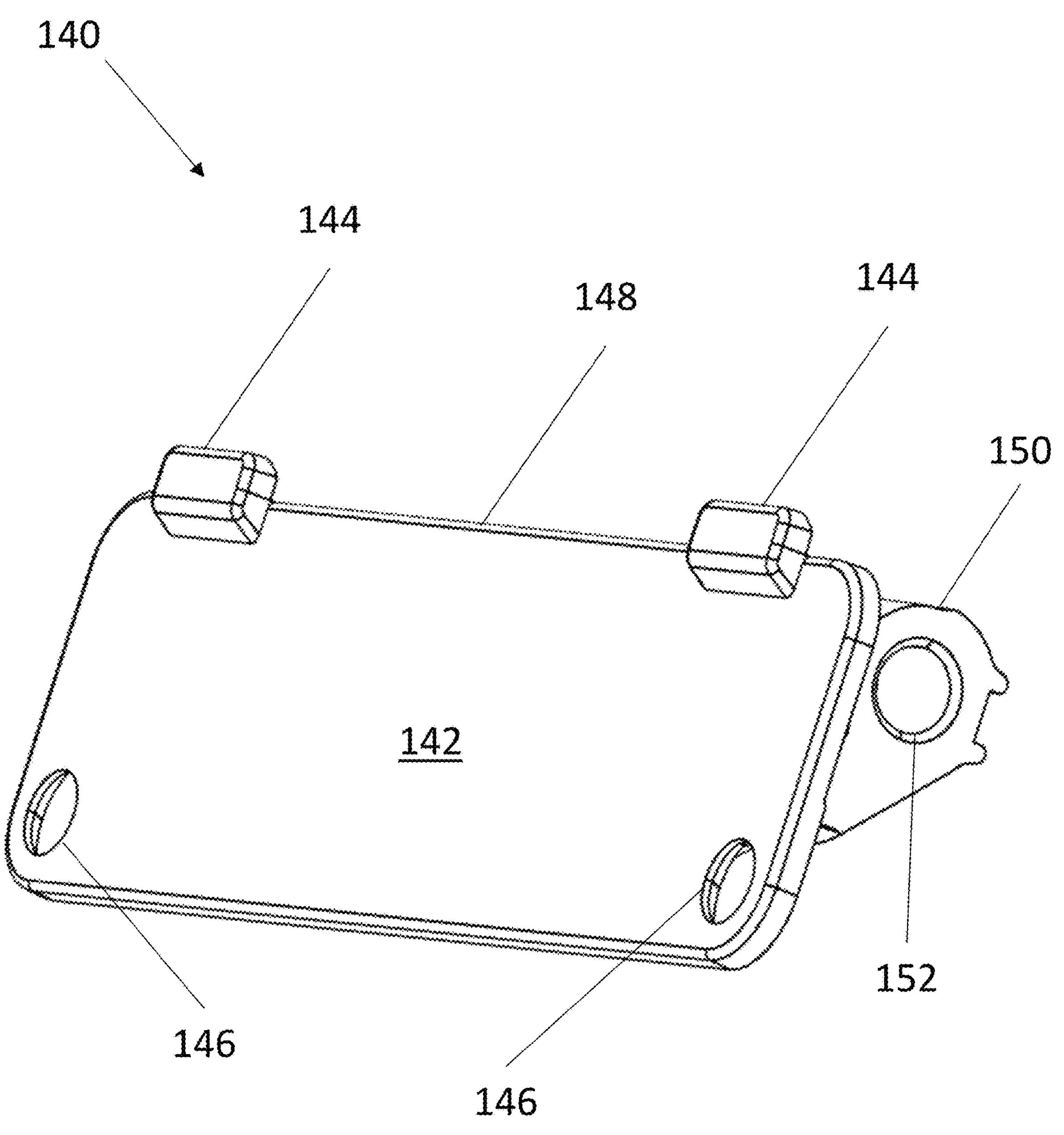
FIG. 3A is an oblique perspective view of a bracket for mounting a monitor to a stand.
Figure 3B:
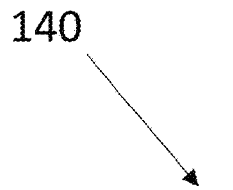
FIG. 3B is an oblique perspective view of a back side of the bracket of FIG. 3B.
Figure 3B:
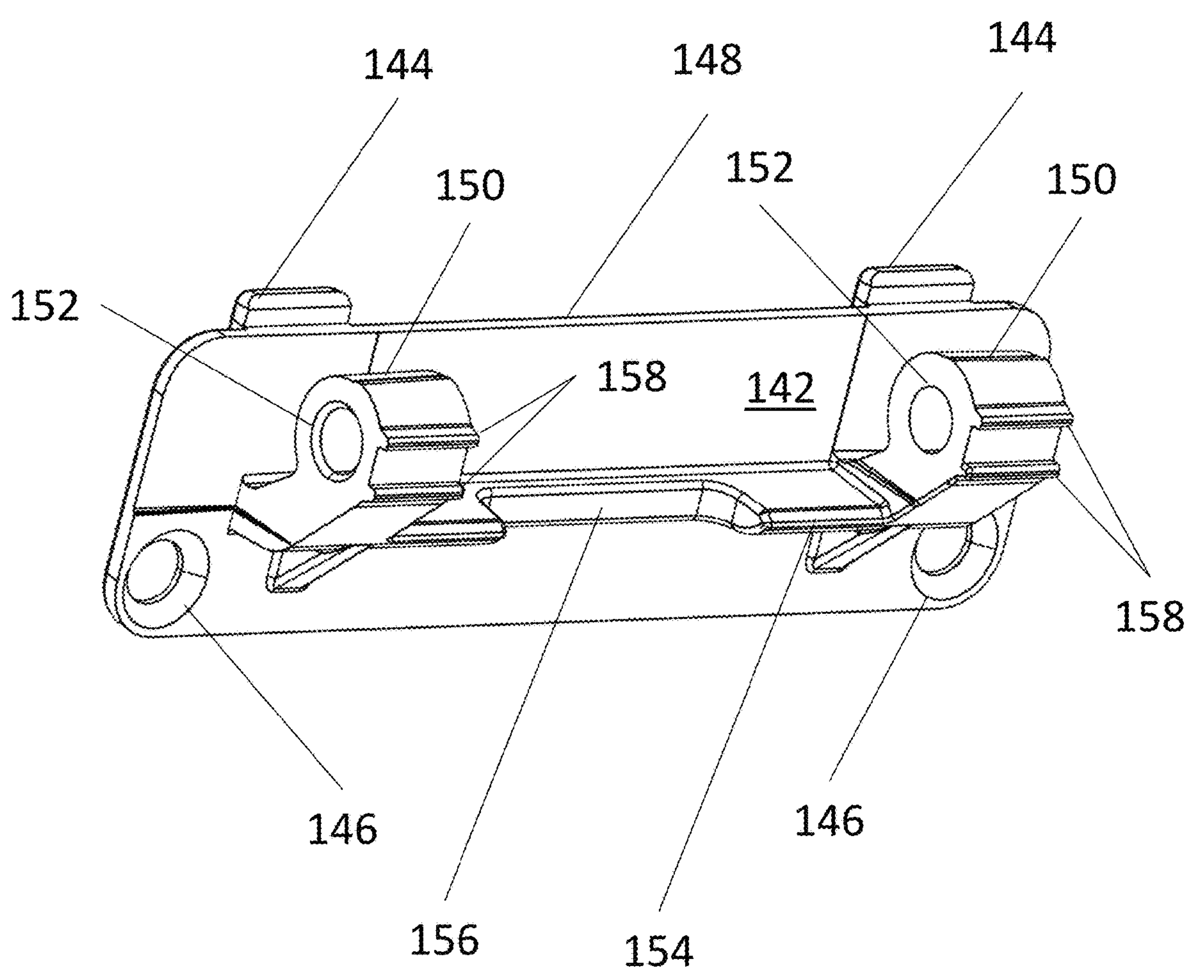

As shown in FIGS. 3A and 3B, bracket 140 comprises a plate 142 and features for connecting plate 142 to monitor 110. In particular, bracket 140 comprises hooks 144 extending from plate 142. Hooks 144 can be used to support monitor 110. Hooks 144 can therefore connect monitor 110 to base 121 without the use of fasteners. Thus, hooks 144 can be used to hold monitor 110 while device 100 remains in an upright position before any fasteners have been applied to fasten monitor 110 to bracket 140. Hooks 144 of the illustrated example are integrally formed with plate 142. However, in other examples, hooks 144 can be separable from plate 142. Hooks 144 according to various examples can have any hook shape suitable for supporting monitor 110, such as the shape extending both outward and upward from plate 142 as shown in FIGS. 3A and 3B, a platform shape, a tab shape, or an arcuate shape.

Plate 142 of bracket 140 comprises an upper edge 148. In some examples, upper edge 148 can cooperate with hooks 144 to support the weight of monitor 110, though in other examples hooks 144 can be configured to support monitor 110 such that upper edge 148 does not bear any of monitor's 110 weight.

Bracket 140 is configured to be fastenable to the monitor 110. In particular, bracket 140 is configured to be fastenable to the monitor 110 to releasably secure monitor 110 to bracket 140 beyond supporting monitor 110 on hooks 144. Thus, bracket 140 of the illustrated example further comprises fastener holes 146. Fastener holes 146 can be positioned below hooks 144. Bracket 140 of the illustrated example comprises exactly two hooks 144 and exactly two fastener holes 146, though in other examples the quantities of such features can vary. For example, bracket 140 could comprise only one hook 144, more than two hooks 144, only one fastener hole 146, or more than two fastener holes 146. Bracket 140 according to further examples can have features other than fastener holes to facilitate fastening bracket 140 to monitor 110, such as movable elements for engaging corresponding features that may be provided in monitor 110.

Fastener holes 146 facilitate fastening monitor 110 to bracket 140 when monitor 110 has already been supported on hooks 144. Thus, a user may support monitor 110 on hooks 144, then drive fasteners through fastener holes 146 to fix monitor 110 to bracket 140 while monitor 110 remains supported on hooks 144. Fasteners suitable for this purpose include screws, nails, and any other implements that may be applied through fastener holes 146 to secure monitor 110 to bracket 140. Users may find this process simpler than fixing monitors to some existing VESA standard mounts, which typically do not provide any way of supporting the monitor on the mount before fasteners have been driven through the mount into the monitor. Thus, whereas fixing a display to a VESA standard mount may require placing the display face down on a surface, then holding the mount above the display while applying the fasteners, bracket 140 of the present disclosure may cooperate with features of monitor 110 to enable device 100 to remain upright through the entire process of connecting monitor 110 to base 121. By supporting monitor 110 on hooks 144 while driving fasteners through fastener holes 146, monitor 110 can be fixed to base 121 while monitor 110 and base 121 remain in a standing position.

Bracket 140 also comprises hubs 150 for pivotably connecting bracket 140 to base 121. Bracket 140 of the illustrated example comprises two hubs 150, though brackets in other examples can comprise a single hub 150 or more than two hubs. In the illustrated example, hubs 150 each comprise a bearing opening 152 configured to receive a respective axle 164, described further below with regard to FIG. 4, of base 121. In other examples, hubs 150 can each comprise an axle configured to be received in corresponding bearing openings defined in base 121.

Hubs 150 of the illustrated example further comprise ribs 158. Ribs 158 can interact with corresponding ribs included by base 121 to provide tactile feedback to a user as bracket 140 is rotated through its range of motion relative to base 121. In some examples, ribs 158 can further define discrete, stable positions within monitor's 110 range of motion relative to base 121. That is, ribs 158 can interact with features of base 121 to provide resistance to movement of monitor 110 across certain points within monitor's 110 range of motion relative to base 121 such that monitor 110 will tend to remain at certain positions except when forcibly adjusted by a user.

Bracket 140 of the illustrated example also comprises a flange 154 extending between hubs 150. Flange 154 acts to provide additional strength and rigidity to bracket 140. Flange 154 can optionally include a cut-out 156 through which a cable 160 (shown in FIG. 4) for connecting monitor 110 to base 121 may pass. Cut-out 156 enables cable 160 to extend along a center line of bracket 140, close to plate 142, which makes it less likely for the cable to bind or get tangled when monitor 110 is tilted and also facilitates discrete cable management contributing to a sleek appearance of device 100. However, in other examples, cut-out 156 can be omitted. In further examples, flange 154 can be omitted.

Figure 4:
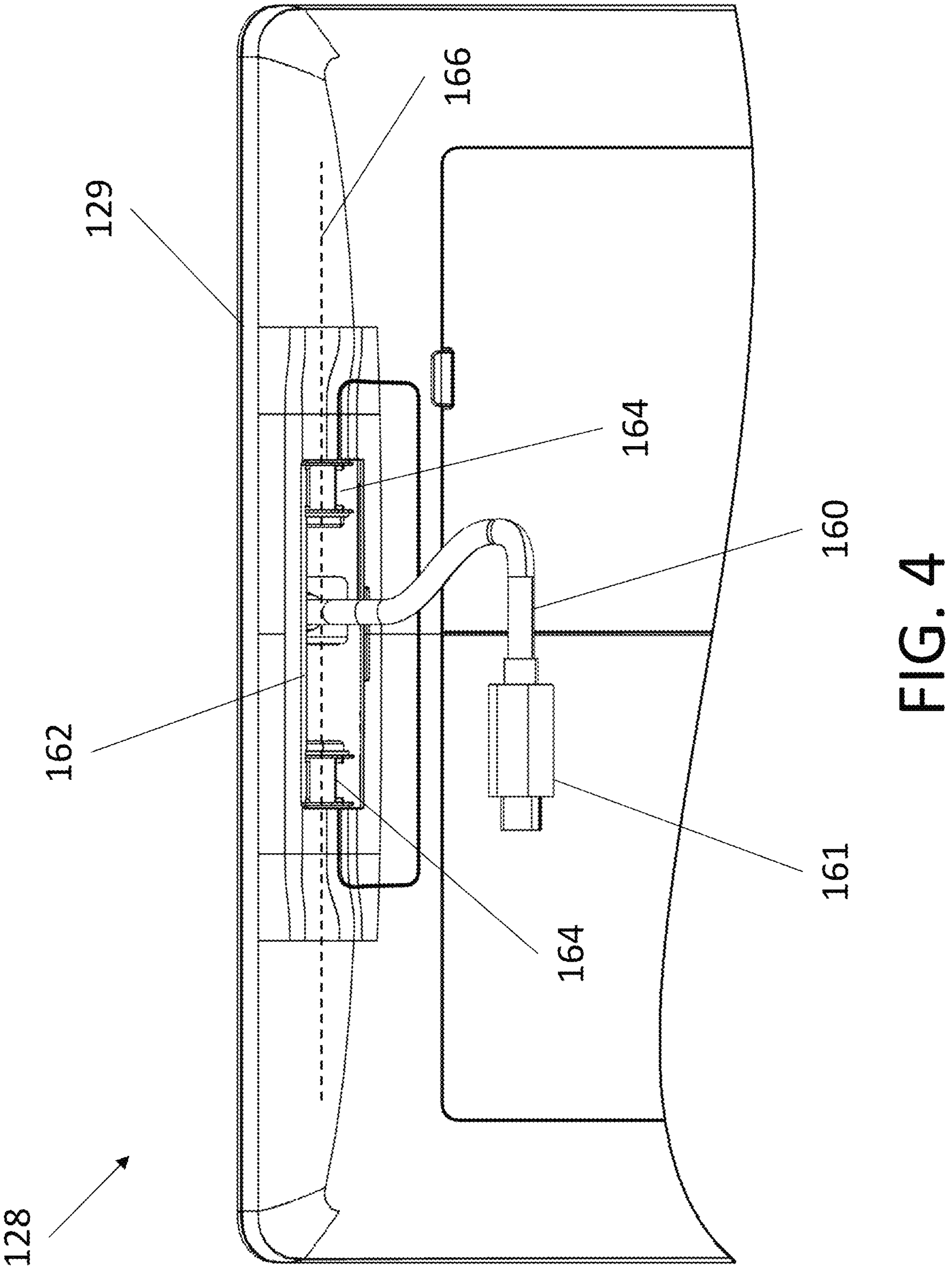
FIG. 4 is a front elevation view of a portion of the base of FIG. 2C.

As shown in FIG. 4, arm 128 comprises an aperture 162 below upper edge 129. Base 121 further comprises cable 160, and cable 160 extends out of base 121 through aperture 162. In the illustrated example, arm 128 further comprises axles 164 for connecting to hubs 150 of bracket 140. Axles 164 extend along and thereby define a pivot axis 166 about which bracket 140 and monitor 110 may pivot relative to base 121. Further according to the illustrated example, axles 164 are positioned within aperture 162. However, in other examples, axles 164 can be positioned outside of aperture 162. In further examples, axles 164 can be comprised by a portion of base 121 other than arm 128. In still further examples, aperture 162 can be comprised by a portion of base 121 other than arm 128. Further, while arm 128 of the illustrated example comprises two axles 164, base 121 according to other examples can comprise axles 164 in any quantity and configuration suitable for connecting to a hub 150 or hubs 150 of bracket 140.

Figure 5:
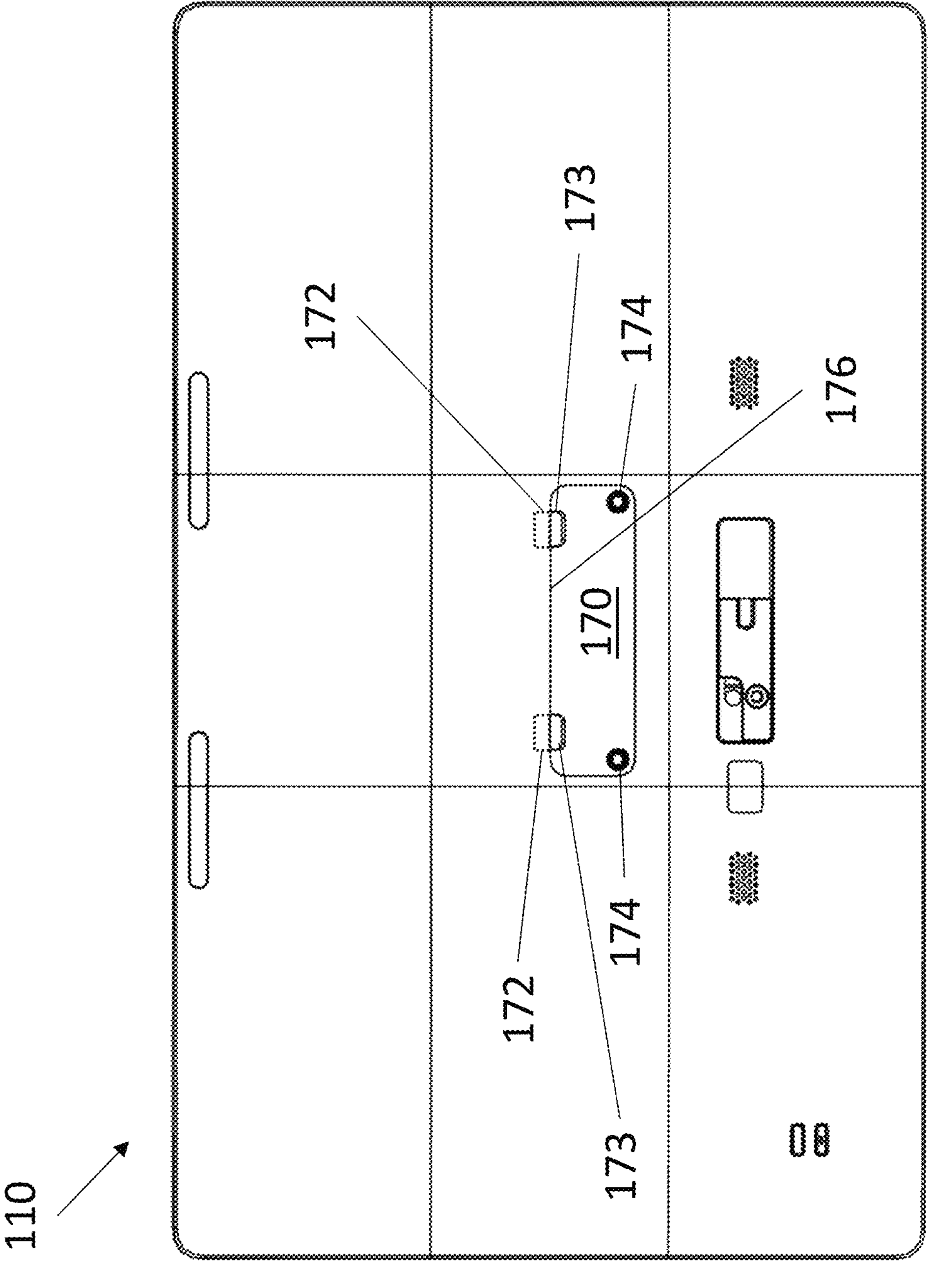
FIG. 5 is a back elevation view of a monitor of the point of sale device of FIG. 1A.

As shown in FIG. 5, monitor 110 comprises multiple features to facilitate mounting monitor 110 to bracket 140. In particular, monitor 110 is configured to rest on hooks 144. Monitor 110 of the illustrated example comprises pockets 172 configured to receive hooks 144. Thus, monitor 110 of the illustrated example is configured to rest on hooks 144 by abutment of interior surfaces of pockets 172 on hooks 144 when hooks 144 are received in pockets 172. Monitor 110 further comprises fastener holes 174. Fastener holes 174 of monitor 110 are positioned to align with fastener holes 146 of bracket 140 when monitor 110 rests on hooks 144. Thus, in the illustrated example, fastener holes 174 of monitor 110 are positioned to align with fastener holes 146 of bracket 140 when hooks 144 are received in pockets 172. Fasteners may therefore be driven through fastener holes 146 of bracket 140 into fastener holes 174 of monitor 110 when monitor 110 rests on hooks 144. Accordingly, as described above with regard to bracket 140, the ability of hooks 144 to support monitor 110 can enable fixation of monitor 110 to base 121 while monitor 110 and base 121 remain upright. Fastener holes 174 of monitor 110 can comprise features for engaging fasteners, such as, for example, internal threading. Fastener holes 174 of monitor can thereby engage fasteners driven through plate 142 into fastener holes 174 to enable secure fixation of monitor 110 to bracket 140.

Pockets 172 of the illustrated example extend behind a back panel of monitor 110 and each define cavity within monitor 110 accessible through a respective opening provided at an exterior of monitor 110. Pockets 172 can further be configured to be complementary in shape to hooks 144. Thus, as hooks 144 of the illustrated example are configured to extend upward from plate 142, the cavity defined by each pocket 172 extends upward behind the back panel of monitor 110 from the respective opening provided at the exterior of monitor 110. Pockets 172 according to other examples can be shaped otherwise to complement hooks 144 of different configurations. Moreover, while the illustrated example includes a number of pockets 172 equal to the number of hooks 144, the number of pockets 172 and hooks 144 can differ in other implementations. For example, monitor 110 can comprise a single pocket 172 large enough to receive two or more hooks 144 of bracket 140. In still further examples, monitor 110 can comprise features other than pockets 172 for engaging hooks 144 of bracket 140, such as, for example, hoops, additional hooks, or any other features that would enable monitor 110 to be supported on bracket 140 by engaging hooks 144.

In the illustrated example, monitor 110 comprises a recess 170 configured to receive plate 142 of bracket 140. Recess 170 can have a depth approximately equal to a thickness of plate 142 so that plate 142 may be flush with an external contour of monitor 110 when monitor 110 is mounted to bracket 140, further contributing to a compact design and sleek appearance for device 100. Recess 170 can be positioned to be obscured from a view of customers viewing device 100 from customer direction 139. Thus, like bracket 140, recess 170 can be configured to be positioned entirely below upper edge 129 of base 121 in at least some positions within monitor's 110 range of motion relative to base 121 when monitor 110 is mounted to bracket 140. However, device 100 according to other examples can lack recess 170.

Monitor's 110 other features for connecting to bracket 140 can also be positioned near or in communication with recess 170. Thus, as shown in the illustrated example, fastener holes 174 of monitor 110 can be positioned within recess 170. Pockets 172 can also be positioned to open into recess 170. For example, grooves 173 within recess 170 can lead into pockets 172.

Monitor 110 of the illustrated example further comprises an overhang 176 defining an upper end of recess 170. In some examples, depending on dimensions of hooks 144 relative to pockets 172, overhang 176 can abut upper edge 148 of plate 142 when monitor 110 is mounted to bracket 140. Upper edge 148 of plate 142 can therefore cooperate with hooks 144 to support monitor 110 in such examples by bearing some of monitor's 110 weight.

Figure 6A:
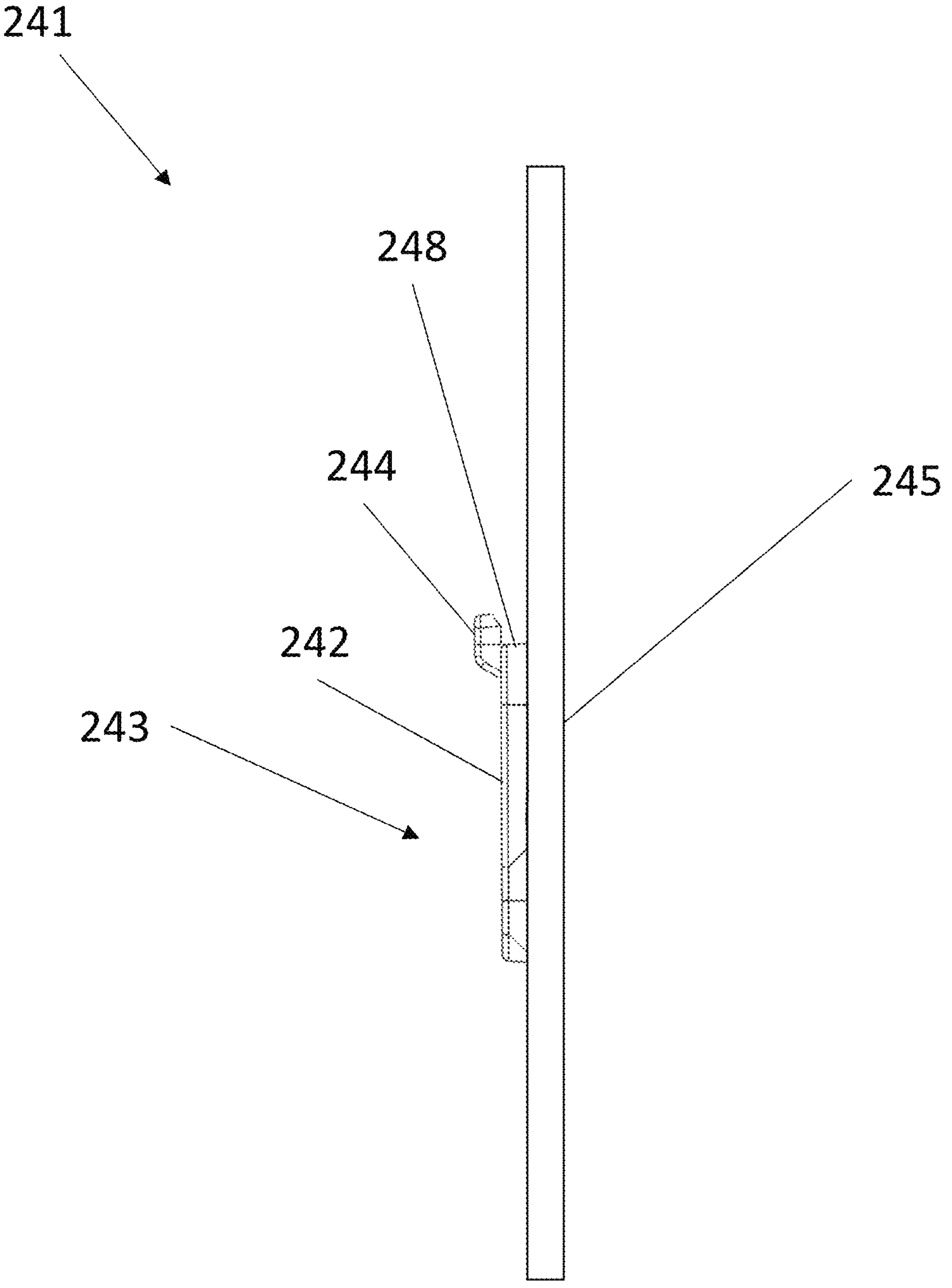
FIG. 6A is a side elevation view of an adapter according to another aspect of the present disclosure.
Figure 6B:
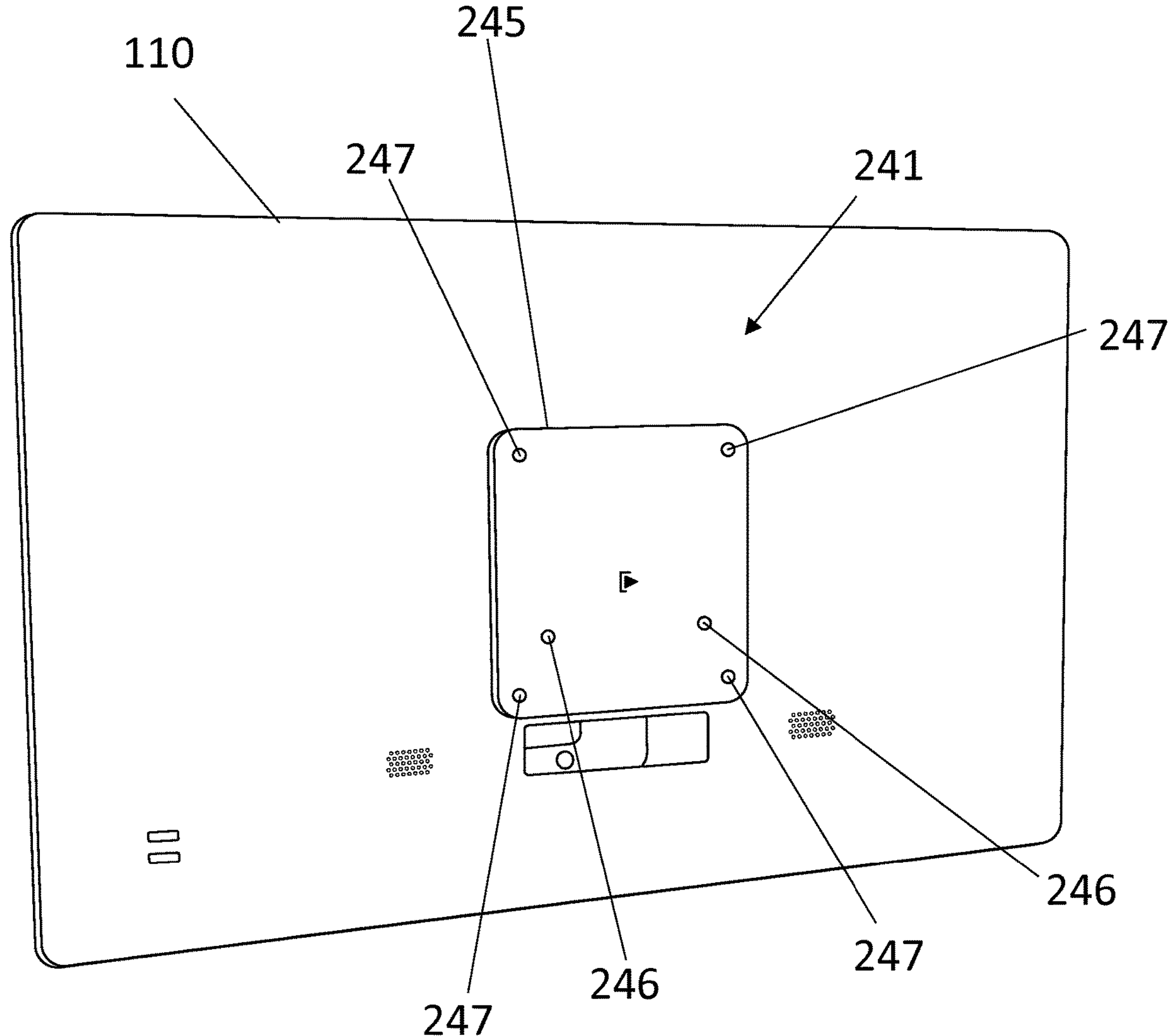
FIG. 6B is an oblique perspective view of the adapter of FIG. 6A applied to a monitor.

FIGS. 6A and 6B show an adapter 241 enabling mounting of a monitor 110 as described above to a bracket having fastener holes, but without additional supporting features such as hooks 144. Adapter 241 comprises a monitor engaging portion 243 and a flange 245. Monitor engaging portion 243 comprises features for engaging monitor 110 in a similar manner to bracket 140. Thus, monitor engaging portion 243 of the illustrated example comprises hooks 244 that can be received in pockets 172 of monitor 110 and first fastener holes 246 configured to align with fastener holes 174 of monitor 110 when monitor 110 is supported on hooks 244. Monitor engaging portion 243 of the illustrated example further comprises a boss 242 of similar dimensions to plate 142. Boss 242 extends from flange 245 and can nest in recess 170 similarly to plate 142. However, monitor engaging portion 243 according to other examples can lack a boss 242 if appropriate for a given implementation of monitor 110.

Referring to FIG. 6B specifically, flange 245 further comprises second fastener holes 247. Second fastener holes 247 enable adapter 241 to be fastened to brackets or other supporting elements having compatible arrangements of fastener holes. Second fastener holes 247 can be arranged in a VESA standard mount hole pattern and can therefore be attached to a VESA bracket. Adapter 241 can therefore provide an interface for a VESA standard bracket connected to features configured to engage monitor 110 in the same way that bracket 140 described above engages monitor 110.

Figure 6C:
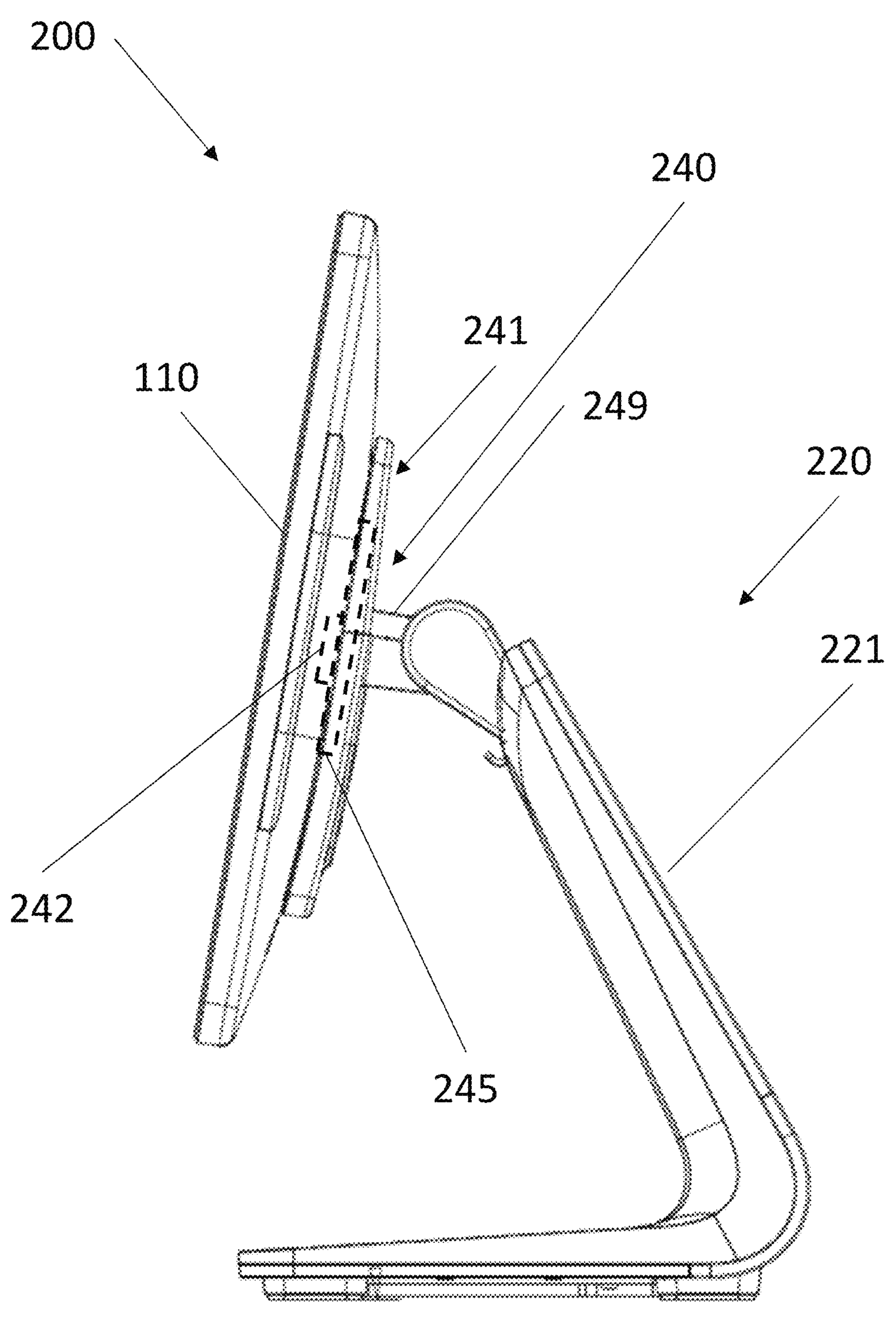
FIG. 6C is a side elevation view of a point of sale device including the adapter of FIG. 6A.

As shown in FIG. 6C, adapter 241 can be used to assemble a point of sale device 200 that comprises a monitor 110 as described above and a stand 220 that comprises a VESA standard bracket 249. In addition to bracket 249, stand 220 comprises base 221. Base 221 can be alike to base 121 described above in all respects other than being coupled to bracket 249 instead of bracket 140 described above with regard to FIGS. 4A and 4B. Adapter 241 and bracket 249 together can form a mount 240 for connecting monitor 110 to base 221. Adapter 241 can thereby enable connection of monitor 110, which is adapted for use with bracket 140, to a stand 220 having VESA standard mounting features. Monitor 110 can be connected to stand 220 by first engaging monitor 110 with monitor engaging portion 243, such as by placing hooks 244 in pockets 172, then fastening adapter 241 to monitor 110, then fastening bracket 249 to adapter 241.

Some users may prefer to use a monitor 110 as described above over a monitor having features for connecting to a VESA mount, but may already possess a stand 220. For example, some users may wish to update preexisting point of sale devices including stand 220 and an older monitor of another style by replacing the older monitor with monitor 110. A monitor 110 and an adapter 241 can be distributed together in a kit to enable users that already have a stand 220 to construct a point of sale device 200.

While some specific embodiments of the present disclosure have been described in detail by way of examples, those skilled in the art will appreciate that the above examples are provided for illustration only, and are not intended to limit the scope of the present disclosure. The various embodiments disclosed herein may be combined arbitrarily without departing from the spirit and scope of the present disclosure. It will also be understood by those skilled in the art that various modifications may be made to the embodiments without departing from the scope and spirit of the present disclosure. The scope of the present disclosure is defined by the appended claims.

What is claimed is:

1. A point of sale (POS) device, comprising:
- a stand comprising:
  - a base comprising:
    - a platform configured to support the POS device, and
    - an arm extending from the platform, wherein the arm comprises an edge that is farther from the platform than the bracket is from the platform, and
  - a bracket that is mounted to the arm and pivotably connected to the base, the bracket comprising a hook and a first fastener hole, wherein the bracket comprises a plate from which the hook extends, and no part of the plate is farther from the platform than the edge is from the platform; and
- a monitor configured to receive the hook and rest on the hook, the monitor comprising a second fastener hole aligned with the first fastener hole when the monitor is resting on the hook.

2. The POS device of claim 1, wherein the hook extends upward from the plate.

3. The POS device of claim 2, wherein the first fastener hole is below the hook.

4. The POS device of claim 1, wherein the base comprises a display.

5. The POS device of claim 4, wherein the display is a first display, the monitor comprises a second display, and the first display and the second display face away from one another.

6. The POS device of claim 1, wherein exactly two fastener holes are defined through the plate, the exactly two fastener holes comprising the first fastener hole.

7. The POS device of claim 1, wherein the monitor comprises a pocket configured to receive the hook.

8. A point of sale (POS) device, comprising:
a stand comprising:
a base comprising:
a platform configured to support the POS device, and
an arm extending from the platform, wherein the arm comprises an edge that is farther from the platform than a bracket is from the platform, and
the bracket that is mounted to the arm and pivotably connected to the base, the bracket comprising a hook and a first fastener hole, wherein the edge is above the platform, the bracket comprises a plate from which the hook extends, and the plate is configured to be positioned entirely below the edge when the POS device rests on the platform; and
a monitor configured to receive the hook and rest on the hook, the monitor comprising a second fastener hole aligned with the first fastener hole when the monitor is resting on the hook.

9. A point of sale (POS) device, comprising:
a stand comprising:
a base, and
a bracket that is pivotably connected to the base, the bracket comprising a hook and a first fastener hole; and
a monitor configured to receive the hook and rest on the hook, the monitor comprising a second fastener hole aligned with the first fastener hole when the monitor is resting on the hook, wherein the hook is a first hook, the bracket comprises a second hook, and the monitor comprises a first pocket and a second pocket configured to receive the first hook and the second hook such that the bracket supports the monitor via the first hook and the second hook without a screw inserted through the first fastener hole and the second fastener hole.

10. A stand for a point of sale device, the stand comprising:
a base that comprises a display facing in a first direction; and
a bracket that is pivotably connected to the base at a pivot point, the bracket comprising a plate and a hook, the hook being configured to support a monitor, the plate comprising a fastener hole, the bracket extending in a second direction from the base, and the second direction being away from the first direction;
wherein the bracket is pivotable to a position at which the hook extends from the plate in a direction that is both radially outward from the pivot point and upward.

11. The stand of claim 10, wherein the bracket is configured to be fastenable to the monitor.

12. The stand of claim 10, wherein the hook extends above the pivot point.

13. The stand of claim 10, wherein the base comprises a platform and an arm that extends from the platform, the arm defining an upper edge, and the bracket is entirely below the upper edge when the bracket is at the position at which the hook is above the pivot point and the fastener hole is below the pivot point.

* * * * *